US010031576B2

(12) United States Patent
Cunningham et al.

(10) Patent No.: US 10,031,576 B2
(45) Date of Patent: Jul. 24, 2018

(54) SPEECH GENERATION DEVICE WITH A HEAD MOUNTED DISPLAY UNIT

(75) Inventors: Bob Cunningham, Pittsburgh, PA (US); Riad Hammoud

(73) Assignee: Dynavox Systems LLC, Pittsburgh, PA (US)

(*) Notice: Subject to any disclaimer, the term of this patent is extended or adjusted under 35 U.S.C. 154(b) by 1354 days.

(21) Appl. No.: 13/702,655

(22) PCT Filed: Jun. 2, 2011
(Under 37 CFR 1.47)

(86) PCT No.: PCT/US2011/038837
§ 371 (c)(1),
(2), (4) Date: Feb. 27, 2013

(87) PCT Pub. No.: WO2011/156195
PCT Pub. Date: Dec. 15, 2011

(65) Prior Publication Data
US 2013/0300636 A1   Nov. 14, 2013

Related U.S. Application Data

(60) Provisional application No. 61/353,022, filed on Jun. 9, 2010.

(51) Int. Cl.
*G06F 3/01*      (2006.01)
*G10L 13/02*    (2013.01)
*G02B 27/01*   (2006.01)
*G10L 13/00*   (2006.01)

(52) U.S. Cl.
CPC ........... *G06F 3/013* (2013.01); *G02B 27/017* (2013.01); *G10L 13/00* (2013.01); *G10L 13/02* (2013.01)

(58) Field of Classification Search
CPC ....... G10L 13/00; G10L 13/02; G02B 27/017; G06F 3/012–3/013
See application file for complete search history.

(56) References Cited

U.S. PATENT DOCUMENTS

| 5,420,828 A * | 5/1995 | Geiger .................. A42B 3/042 367/131 |
| 6,608,615 B1 * | 8/2003 | Martins .................. G06F 3/013 345/156 |
| 2002/0065649 A1 | 5/2002 | Kim |
| 2002/0194005 A1 | 12/2002 | Lahr |
| 2003/0123027 A1 | 7/2003 | Amir et al. |
| 2004/0061831 A1 * | 4/2004 | Aughey ................ A61B 3/113 351/209 |
| 2005/0206583 A1 | 9/2005 | Lemelson et al. |
| 2007/0024579 A1 * | 2/2007 | Rosenberg ............. G06F 3/013 345/156 |

(Continued)

OTHER PUBLICATIONS

International Search Report and Written Opinion, dated Dec. 27, 2011.

*Primary Examiner* — Liliana Cerullo
(74) *Attorney, Agent, or Firm* — Dority & Manning, P.A.

(57) ABSTRACT

A speech generation device is disclosed. The speech generation device may include a head mounted display unit having a variety of different components that enhance the functionality of the speech generation device. The speech generation device may further include computer-readable medium that, when executed by a processor, instruct the speech generation device to perform desired functions.

17 Claims, 4 Drawing Sheets

(56) References Cited

U.S. PATENT DOCUMENTS

| | | | |
|---|---|---|---|
| 2008/0030461 A1* | 2/2008 | Matsui | G06F 3/011 345/156 |
| 2008/0030463 A1 | 2/2008 | Forest | |
| 2010/0238161 A1* | 9/2010 | Varga | G06T 17/05 345/419 |
| 2011/0001699 A1* | 1/2011 | Jacobsen | G06F 3/012 345/157 |

* cited by examiner

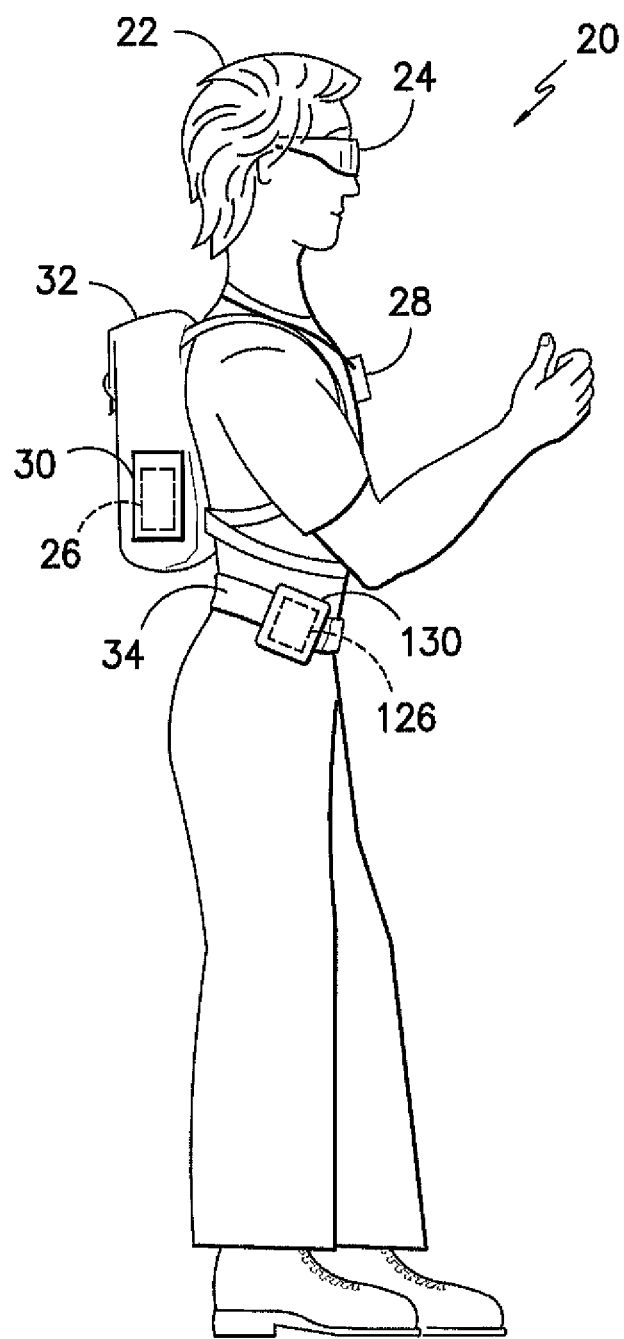
FIG. −1−

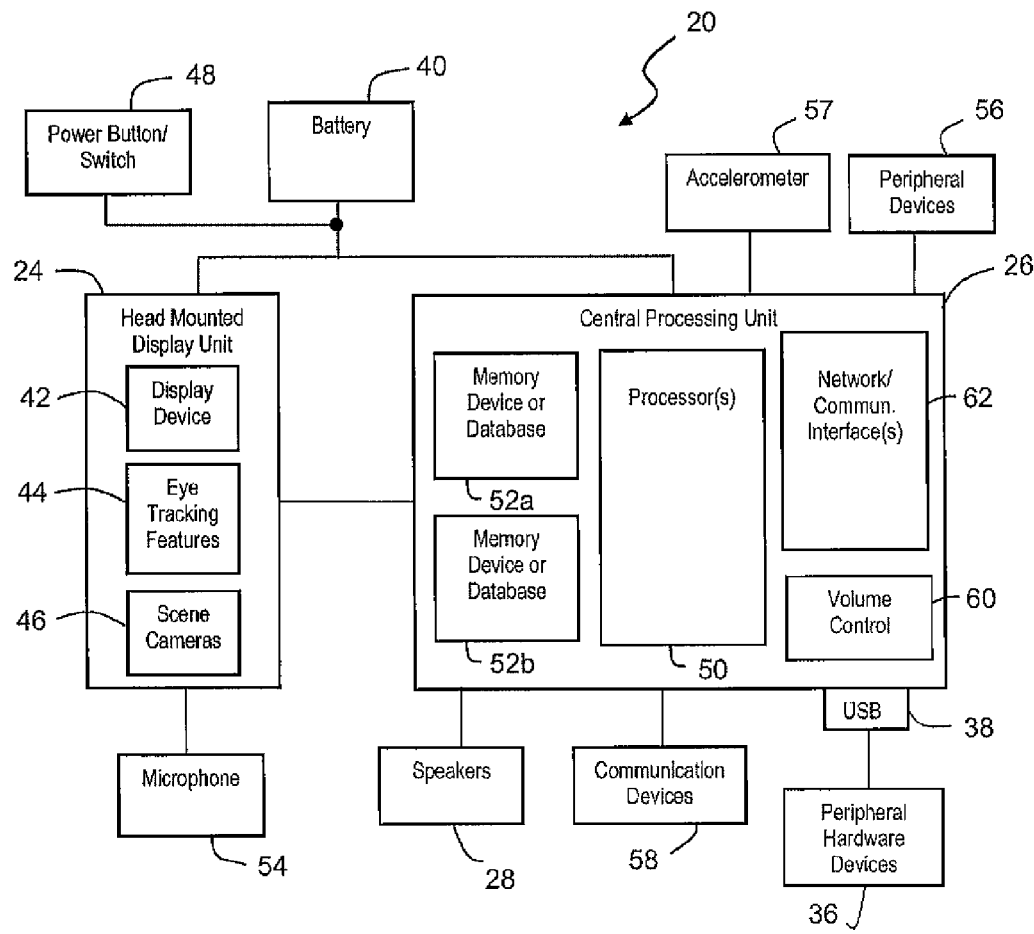
*FIG. −2−*

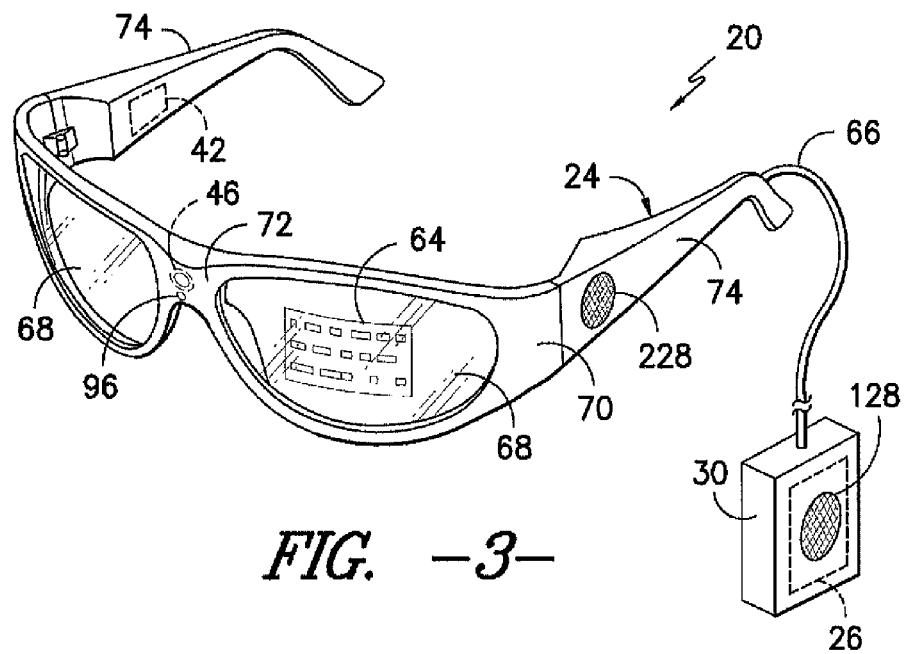
FIG. -3-
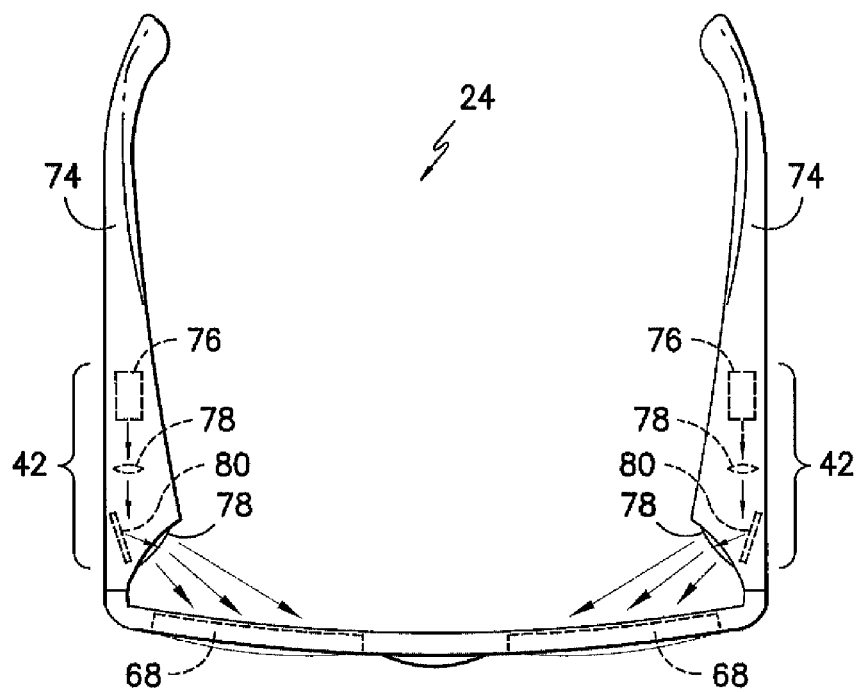
FIG. -4-

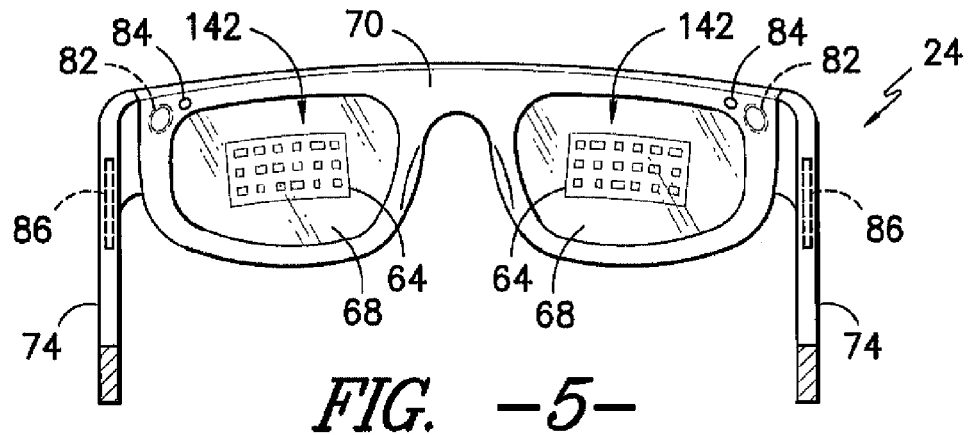
FIG. -5-
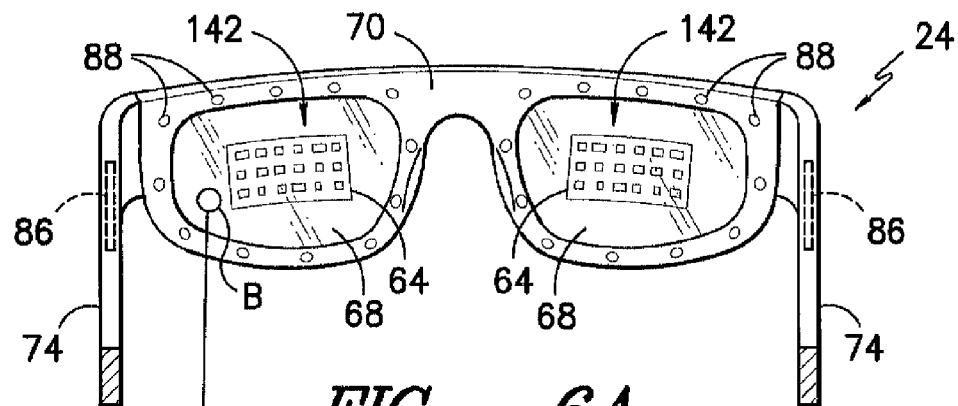
FIG. -6A-
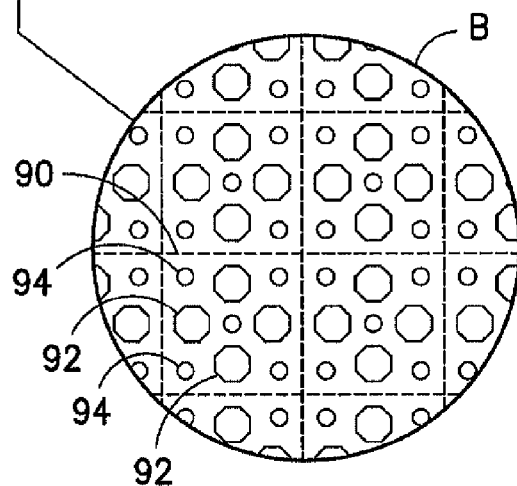
FIG. -6B-

SPEECH GENERATION DEVICE WITH A HEAD MOUNTED DISPLAY UNIT

PRIORITY CLAIM

This application claims the benefit of previously filed U.S. Provisional Patent Application entitled "SPEECH GENERATION DEVICE WITH A HEAD MOUNTED DISPLAY UNIT," assigned U.S. Ser. No. 61/353,022, filed Jun. 9, 2010, and which is fully incorporated herein by reference for all purposes.

BACKGROUND OF THE INVENTION

The present invention generally pertains to speech generation devices and, more particularly, to speech generation devices that include head mounted display units.

Various debilitating physical conditions, whether resulting from disease or injuries, can deprive the afflicted person of the ability to communicate audibly with persons or devices in one's environment in real time. For example, many individuals may experience speech and learning challenges as a result of pre-existing or developed conditions such as autism, ALS, cerebral palsy, stroke, brain injury and others. In addition, accidents or injuries suffered during armed combat, whether by domestic police officers or by soldiers engaged in battle zones in foreign theaters, are swelling the population of potential users. Persons lacking the ability to communicate audibly can compensate for this deficiency by the use of speech generation devices.

Speech generation devices (SGDs), some embodiments of which may be known as Alternative and Augmentative Communications (AAC) devices, can include a variety of features to assist with a user's communication. In general, a speech generation device may include an electronic interface with specialized software configured to permit the creation and manipulation of digital messages that can be translated into audio speech output. Additional communication-related features may also be provided depending on user preferences and abilities. Users may provide input to a speech generation device by physical selection using a touch screen, mouse, joystick, physical input switches or the like or by other means such as eye tracking or head tracking.

It is estimated that less than ten percent (10%) of the potential users of speech generation devices currently are being served by conventional speech generation devices. This population is highly variable from the standpoint of a range in ages from preschool children through elderly adults and a variety of lifestyles, geographic locations, educational attainments, language sophistication, and available physical motor skills to operate the speech generation device. As such, a need exists for further refinements and improvements to speech generation devices that continuously adapt such devices for a greater number and variety of users.

Conventional speech generation devices are generally used across a wide range of applications and settings. For example, some speech generation devices are used as desktop devices, while others are rendered portable by being mounted on vehicles such as wheelchairs or by being configured as handheld devices. To accommodate such varied uses, the multitude of hardware and software features of an SGD are typically built into a single integrated assembly. Thus, the onboard computers and other processing equipment are often disposed in a single housing together with the plethora of peripheral devices such as display units, microphones, speakers as well as other features.

As an integrated assembly, the size of a conventional SGD is often quite substantial. As such, some speech generation devices can have particular drawbacks when used as portable devices. For example, an SGD must generally be disposed in a location that provides a user visual access to the display of the SGD. Thus, for a user who must communicate utilizing an SGD mounted to his wheelchair, bulky conventional devices may potentially block the user's view to other objects in his environment and may also obscure the user from others. This restriction of a user's visual vantage can sometimes be awkward for a user, particularly when the user's mobility within the wheelchair is limited (e.g., the ability of the user to adjust his seating position). Moreover, conventional integrated units are often relatively heavy due to the plurality of hardware components incorporated therein. Thus, these devices may be very burdensome and awkward to carry or otherwise transport. Such devices are also more likely to cause damage to the SGD if the device is dropped. Accordingly, a need exists to reduce the size, weight and overall portability of an SGD.

Additionally, current speech generation devices typically consume large amounts of power. In particular, the display units associated with many conventional SGDs have substantial power requirements which require the SGD be located near an electrical outlet and, thus, limit freedom of movement of the user. Other conventional speech generation devices seek to overcome this problem with the provision of a battery, but still must be recharged at periodic intervals. Substantial power requirements also can be related to issues of size, weight and excessive heat generation in a device. Because of these many concerns, a further need exists to generally reduce the power requirements, size and weight of various SGD components, including the display units.

Further, speech generation devices are often designed with a particular type of user in mind and, thus, lack the ability to be used by varying persons having a wide range of physical disabilities. For example, conventional SGDs may require a user to provide some sort of physical input, such as contacting a touch screen or actuating a physical switch, to enable the user to make selections relating to desired functions to be performed by the SGD. Such devices, however, may exclude use by persons that have limited motor control or by persons expected to have diminishing motor control with the passage of time. Accordingly, a need exists for an SGD that may be used by persons having a variety of physical disabilities.

In light of the various design concerns in the field of speech generation devices, a need continues to exist for refinements and improvements to address such concerns. While various implementations of speech generation devices and associated features have been developed, no design has emerged that is known to generally encompass all of the desired characteristics hereafter presented in accordance with aspects of the subject technology.

BRIEF SUMMARY OF THE INVENTION

In general, the present subject matter is directed to various exemplary speech generation devices (SGDs) that include head mounted display units.

For example, exemplary speech generation devices in accordance with aspects of the presently disclosed technology may include a head mounted display unit configured to be worn as an item on a user's head. In a particular embodiment, the head mounted display unit may be configured as eyewear, such as a pair of glasses (e.g., eyeglasses or sunglasses). Additionally, the SGD may include a central processing unit configured to provide processing functionality to the head mounted display unit and the various other components of the SGD. For instance, the central processing unit may include a process and a related computer-readable medium storing instructions executable by the processor, with the instructions configuring the SGD to generate text-to-speech output and/or to perform various other functions described herein. In various embodiments, the central processing unit may be provided in a distal relationship with the head mounted display unit or may be integrated into the head mounted display unit. For instance, the central processing unit may be disposed in a separate housing module positioned at any suitable location relative to the user which allows communication between the processing unit and the head mounted display unit via a wired or wireless connection.

Generally, the head mounted display unit and associated processing unit may enable the SGD to transmit and receive messages to assist a user in communicating with others. For example, the SGD may correspond to a particular special-purpose electronic device that permits a user to communicate with others by producing digitized or synthesized speech based on configured messages. Such messages may be preconfigured and/or selected and/or composed by a user within a message window displayed on the head mounted display unit.

In several embodiments, the head mounted display unit may include various input and output components for the SGD. For example, the head mounted display unit may include a display device for displaying one or more images (e.g., menus, keypads or other graphical user interfaces) within a field of view of the user that overlay the user's normal front-facing view. Additionally, the head mounted display unit may include eye tracking features for detecting and tracking the movement of the user's eyes. Further, the head mounted display unit may include one or more scene cameras that permit a front-facing view of the user to be input into the SGD.

In general, the disclosed SGD provides numerous advantages for a user of a speech generation device. For example, because the head mounted display unit can be configured as any item to be worn on a user's head (e.g., glasses), the display unit can be styled to have a very discreet appearance. As such, a user can confidently use the SGD in public without feeling self-conscious, looking awkward and/or or having to carry around a bulky device that looks out of place. The head mounted display unit may also be designed to be relatively compact and lightweight. As such, the disclosed SGD is rendered very portable. Additionally, because the SGD's display is head mounted and does not need to be carried, it leaves the user's hands free for other uses. A lightweight device may also reduce the likelihood of damage occurring to any components of the SGD in the event that they are dropped. Moreover, because the head mounted display unit may be configured as a separate component from the central processing unit, greater design flexibility is available for providing an SGD that may be customized to meet the demands of a particular user. Separation of the components of an SGD may also provide for a greater of number of standard models to be offered to potential users (e.g., devices including differing display devices, eye tracking features, and/or processor configurations) and may further permit existing users to upgrade their devices with greater ease and less expense.

In various embodiments of the present subject matter, additional advantages may be provided by the integration of eye tracking features into the head mounted display unit. For example, in one embodiment, eye tracking features may be embedded within or mounted to the head mounted display unit. Such eye tracking features may permit the SGD to accurately estimate the centers of the user's eyes, pupils and corneal-reflexes by employing detection and tracking algorithms. As a result, the user may utilize eye actions to make input selections and otherwise control the speech generation device. Thus, the eye tracking features may generally provide hands-free use of the disclosed SGD, which permits the speech generation device to be used by persons having a wide variety of physical disabilities and, particularly, by those having little or no motor control.

In several embodiments of the present subject matter, a display device may be embedded within or mounted to the head mounted display unit and may be configured to project images generated by the central processing unit into the field of view of the user or, in some embodiments, directly onto the retina of the user. In alternative embodiments, the lenses or other suitable components(s) of the head mounted display unit may be configured as transparent or non-transparent display devices such that the images generated by the processing unit may be displayed directly on the lenses.

The various display devices of the disclosed SGD may offer numerous advantages for the user of a speech generation device. Specifically, the head mounted display unit may be configured such that a user maintains a full, front-facing view of his environment, with the display device simply providing graphical user interfaces as an overlay to such front-facing view. As such, the disclosed SGD eliminates the potential visual restriction that typically accompanies a conventional SGD. Moreover, due to the size of the head mounted display unit, the disclosed display devices may be relatively small and have low power consumption. As such, the freedom of movement of the user may be increased significantly, as the device may be used for longer periods of time between recharging the batteries.

In further embodiments, a forward-facing scene camera may be embedded within or mounted to the head mounted display unit. The scene camera may generally be configured to capture images of a user's front-facing view and, thereby, provide additional advantages for the disclosed SGD. For example, the scene camera may be used to calibrate the SGD to any exterior surface. As such, the SGD may be used to interact with various objects within a user's environment, such as through an environmental control system. Additionally, input from the scene camera may be used to augment user inputs provided by the eye tracking features of the disclosed SGD. For instance, the scene camera may allow the user to provide inputs to the SGD using simple hand gestures.

In still further embodiments, the disclosed SGD may include additional hardware components and/or features. For example, the SGD may include various communications devices and/or modules and related communications functionality. Such additional components and/or features will be described in greater detail below.

Moreover, in several embodiments, a method is disclosed for calibrating a user's eye gaze to an exterior surface within the user's environment utilizing the head mounted display unit and disclosed eye tracking features. The method may include projecting one or more calibration points onto or adjacent to the exterior surface, capturing one or more images of the projected calibration points, capturing one or more images of at least one of the user's eyes with the eye tracking features and correlating the one or more images of the projected calibration points to the one or more images of the user's eyes.

Additional aspects and advantages of the invention will be set forth in part in the description that follows, and in part will be obvious from the description, or may be learned by practice of the invention. The various aspects and advantages of the invention may be realized and attained by means of the instrumentalities and combinations particularly described below.

BRIEF DESCRIPTION OF THE DRAWINGS

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

FIG. 1 illustrates an embodiment of a speech generation device in accordance with aspects of the present subject matter, particularly illustrating various components of the speech generation device being worn by or attached to a user;

FIG. 2 illustrates a schematic diagram of hardware components for use within an embodiment of a speech generation device in accordance with aspects of the present subject matter;

FIG. 3 illustrates another embodiment of a speech generation device in accordance with aspects of the present subject matter, particularly illustrating a perspective front view of various features of an embodiment of a head mounted display unit of the speech generation device;

FIG. 4 illustrates a top view of one embodiment of a head mounted display unit in accordance with aspects of the present subject matter, particularly illustrating an embodiment of a display device of the head mounted display unit;

FIG. 5 illustrates a back view of another embodiment of a head mounted display unit in accordance with aspects of the present subject matter, particularly illustrating an embodiment of eye tracking features of the head mounted display unit;

FIG. 6A illustrates a back view of a further embodiment of a head mounted display unit in accordance with aspects of the present subject matter, particularly illustrating another embodiment of eye tracking features of the head mounted display unit; and FIG. 6B illustrates a blown-up view of an embodiment of the lens of the head mounted display unit depicted in FIG. 6A, particularly illustrating a further embodiment of eye tracking features of the head mounted display unit.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

Referring to the drawings, FIG. 1 illustrates an embodiment of a speech generation device (SGD) 20 in accordance with aspects of the present subject matter, with various components of the SGD 20 being worn by or attached to a user 22. Generally, the SGD 20 includes a head mounted display unit 24 and a central processing unit 26. The head mounted display unit 24 of the present subject matter may be generally configured as any item to be worn, secured or otherwise disposed on a user's head. For example, as shown in FIG. 1, the head mounted display unit 24 may take the form of any suitable type of eyewear, such as a pair of eyeglasses or sunglasses. In other embodiments, the head mounted display unit 24 may be configured as a helmet, goggles or any other known head mounted item. Additionally, various input and output components of the SGD 20 may be integrated into the head mounted display unit 24. For example, display devices, eye tracking features, scene cameras, input/output devices and other components of an SGD 20 may be mounted to or embedded within the head mounted display unit 24, which will be described in greater detail below. The central processing unit 26 of the SGD 20 is generally configured to provide processing functionality to the head mounted display unit 24 and the various other components of the SGD 20. Thus, it should be appreciated that each component of the SGD 20 may be directly or indirectly coupled to the central processing unit 26 via a wired or wireless connection for communication therewith. It should also be appreciated that the SGD 20 may include various other components and features. For instance, the SGD 20 may include one or more speakers 28 for generating audio outputs corresponding to speech selected by the user 22. Thus, as shown in FIG. 1, a speaker 28 may be worn as a pendant around the user's neck. In such an embodiment, the speaker 28 may be in communication with the central processing unit 26 via a wired connection or through any suitable wireless communications protocol, such as through a BLUETOOTH connection. The speaker(s) 28 and various other components and/or features of the SGD 20 will be described in greater detail below.

Referring still to FIG. 1, in one embodiment, the head mounted display unit 24 and the central processing unit 26 may be generally disposed in a distal relationship from one another. For example, the central processing unit 26 may be disposed in a separate housing module 30 located on or adjacent to the user 22. Thus, as shown in FIG. 1, the housing module 30 may be stored in a backpack 32 worn by the user 22. In another embodiment, also shown in FIG. 1, a central processing unit 126 and housing module 130 may be connected to the user's clothes (e.g. the user's belt 34) through a belt clip or any other suitable mechanical fastener. Of course, it should be appreciated that the housing module 30 may be stored on or in any other item that is sufficiently close to the user 22 to allow communication between the head mounted display unit 24 and the processing unit 26 via a wired or wireless connection. For instance, in various embodiments, the housing module 30 may be disposed in a user's pocketbook, knapsack, shirt pocket, pants pocket and the like. In other embodiments, the housing module 30 may be placed on or within a user's wheelchair, bed, chair, nightstand, desk or any other item disposed closely adjacent to the user 22. In even further embodiments, the housing module 30 may be attached to the user 22, such as by being worn as a pendant around the user's neck or wrist.

It should be appreciated that, in alternative embodiments, the SGD 20 of the present subject matter may be provided as an integrated assembly, with the central processing unit 26 being embedded within or mounted to the head mounted display unit 24. For example, the central processing unit 26 may be configured to be embedded within the frame of the head mounted display unit 24 or may be disposed in a compact housing module 30 secured to the outside of the frame. Relatively small processing units that may be embedded within or mounted onto the head mounted display unit 24 are commercially available, for example, from Gumstix, Inc. of San Jose, Calif.

The housing module 30 may generally form a protective casing or covering for the central processing unit 26 and any functional components and/or other features of the SGD 20 disposed therein or mounted thereon. As such, the housing module 30 may be formed or molded from any substantially rigid and/or durable material. For example, in one embodiment, the housing module 30 may be formed from a material such as but not limited to plastic, thermoplastic, polymer, polyethylene, metal, or resin material. In another embodiment, the housing module 30 may be formed from magnesium or an alloy thereof. In particular, when magnesium is used to make the housing module 30, it may provide several advantages for an SGD 20 including but not limited to additional conductive and radiated immunity, shielding from electromagnetic interference (EMI) signals, heat dissipation features for an SGD 20, and greater structural integrity with low weight. Additionally, it should be appreciated that, in one embodiment, the housing module 30 may be rendered liquid impermeable when formed.

The housing module 30 may also define various openings to accommodate data input and output as well additional features of the SGD 20. For example, openings may be defined through the housing module 30 to provide locations for power buttons, volume control knobs, USB ports for coupling any peripheral devices of the SGD 20 to the central processing unit 26 and various other data input/output ports. Further, openings may also be defined through the housing module 30 to permit the mounting or embedding of various output devices of the SGD 20. For example, as shown in FIG. 3, one or more speakers 128 may be mounted within an opening defined in the housing module 30. Additionally, it should be appreciated that, in embodiments in which the housing module 30 is generally not accessible to the user 22, any buttons, control knobs, ports and the like may be provided in an alternative location more accessible to the user (e.g., on the head mounted display unit 24, on a remote control provided to the user 22, or any other suitable item) and then interfaced with the processing unit 26 by any suitable means, such as through any known wireless communications protocol.

Referring now to FIG. 2, various electronic components intended for selective use with a speech generation device in accordance with aspects of the present subject matter are illustrated. Generally, the electronic components may include a combination of hardware, software and/or firmware elements, all of which either correspond to physical tangible apparatuses or which are embedded as instructions on a physical and tangible apparatus such as a computer-readable storage medium. It should be appreciated that the components shown in FIG. 2 may be provided in different configurations and may be provided with different arrangements of direct and/or indirect physical and communicative links to perform the desired functionality of such components. Additionally, it should be appreciated that the solid lines connecting the numbered components depicted in FIG. 2 indicate electronic connections for either the supply of power to a component or for data transmission between the connected components. Such electronic connections include both wired connections and connections via any known wireless communications protocol. Similarly, the solid circle between the battery connection and the connection from the power button/switch indicates that such connections are coupled together.

In general, the electronic components of an SGD enable the device to transmit and receive messages to assist a user in communicating with others. For example, the SGD may correspond to a particular special-purpose electronic device that permits a user to communicate with others by producing digitized or synthesized speech based on configured messages. Such messages may be preconfigured and/or selected and/or composed by a user within a message window provided as part of the speech generation device user interface. As will be described below, a variety of input devices and software interface features may be provided to facilitate the capture of user input to define what information should be displayed in a message window and ultimately communicated to others as spoken output or other outgoing communication.

Referring to FIG. 2, the SGD 20 may generally include a central processing unit 26, a head mounted display unit 24 and various other peripheral components and features. The central processing unit 26 and various other components of the SGD 20 will be generally described with reference to FIG. 2. The head mounted display unit 24 and several of the components and/or features that may be optionally integrated within the display unit 24 will be described with reference to FIGS. 3-6B. In addition to the specific devices discussed herein, it should be appreciated that any peripheral hardware device 36 may be provided and interfaced to the speech generation device 20 via a USB port 38 or other communicative coupling.

Power to the components of the SGD 20 generally may be provided from a battery 40, such as but not limited to a lithium polymer battery or any other rechargeable energy source. For example, in one embodiment, power may be supplied to the central processing unit 26, the head mounted display unit 24, and any other components of the SGD 20 from a single battery 40 disposed in the housing module 30. In such an embodiment, a power cord may be provided between the battery 40 and the head mounted display unit 24 to supply power to any components embedded within or secured to the display unit 24. In an alternative embodiment, multiple power sources may be utilized to supply electric power to the various SGD components. For instance, a first battery 40 may be provided to supply power to the components of the head mounted display unit 24, while a second battery 40 may supply power to the processing unit 24 and any other peripheral devices. Additionally, a power switch or button 48 may be provided as an interface to toggle the power connection between the battery 40 and any powered components. Such power button 48, in one embodiment, may be located in an opening defined in the housing module 30. In other embodiments, particularly when the housing module 30 is stored out of reach of the user 22, the power button 48 may be disposed at any location accessible to the user 22, such as on the head mounted display unit 24 or at any other suitable location.

Referring still to FIG. 2, a central processing unit 26 is generally provided to function as the central controller within the SGD 20 and may generally include such components as at least one memory/media element or database for storing data and software instructions as well as at least one processor. In the particular example of FIG. 2, one or more processor(s) 50 and associated memory/media devices 52a and 52b are configured to perform a variety of computer-implemented functions (i.e., software-based data services). The central processing unit 26 may be adapted to operate as a special-purpose machine by executing the software instructions rendered in a computer-readable form stored in memory/media element 52*a*. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits. Additionally, the one or more processor(s) 50 within the central processing unit 26 may be configured for operation with any predetermined operating systems, such as but not limited to Windows XP, and thus is an open system that is capable of running any application that can be run on Windows XP. Other possible operating systems include BSD UNIX, Darwin (Mac OS X), Linux, SunOS (Solaris/OpenSolaris), and Windows NT (XP/Vista/7).

At least one memory/media device (e.g., device 52*a* in FIG. 2) is dedicated to storing software and/or firmware in the form of computer-readable and executable instructions that will be implemented by the one or more processor(s) 50. Other memory/media devices (e.g., memory/media devices 52*b*) are used to store data which also will be accessible by the processor(s) 50 and which will be acted on per the software instructions stored in memory/media device 52*a*. The various memory/media devices of FIG. 2 may be provided as a single or multiple portions of one or more varieties of computer-readable media, such as but not limited to any combination of volatile memory (e.g., random access memory (RAM), such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. In some embodiments, at least one memory device corresponds to an electromechanical hard drive and/or or a solid state drive (e.g., a flash drive) that easily withstands shocks, for example that may occur if the housing module 30, encompassing the central processing unit 26, is dropped. Although FIG. 2 shows two separate memory/media devices 52*a* and 52*b*, the content dedicated to such devices may actually be stored in one memory/media device or in multiple devices. Any such possible variations and other variations of data storage will be appreciated by one of ordinary skill in the art.

In one particular embodiment of the present subject matter, a first portion of memory/media device 52*b* is configured to store input data received from a user 22 for performing the desired functional steps associated with a speech generation device. For example, data in memory 52*b* may include inputs received from one or more peripheral devices of the SGD 20, including but not limited to eye tracking features 44, scene camera(s) 46, microphone(s) 54, and other peripheral devices 56, which indicate a user's selections of text to be spoken by the SGD 20 or provide information needed by the SGD 20 to performs its various functions. Memory device 52*a* includes computer-executable software instructions that can be read and executed by processor(s) 50 to act on the data stored in memory/media device 52*b* to create new output data (e.g., audio signals, display signals, control signals, other output from various image processing and eye tracking algorithms and the like) for temporary or permanent storage in one of the memory/media devices. Such output data may be later communicated to integrated and/or peripheral output devices, such as a display device 42, speakers 28, communication devices 58, other suitable output devices, or as control signals to still further components.

Referring still to FIG. 2, various input devices may be part of an SGD 20 and thus coupled directly or indirectly to the central processing unit 26. For example, eye tracking features 44 may be provided within the head mounted display unit 24 to capture user inputs by tracking the user's eye movement/location. The head mounted display unit 24 may also include one or more scene cameras 46 for capturing the front-facing view of the user 22. Additionally, a microphone 54, such as a surface mount CMOS/MEMS silicon-based microphone or others, may be provided to capture user audio inputs and may be disposed on or within the head mounted display unit 24 or at any other suitable location relative to the user 22 (e.g., clipped onto the user's clothes). Other exemplary input devices (e.g., peripheral device 56) may include but are not limited to a peripheral keyboard, peripheral microphone, one or more physical input switches and the like. In general, the different types of input devices (including optional peripheral devices) may be configured with software instructions to accept user inputs in accordance with one or more input selection methods (e.g., scanning, physical switch, hand gesture, physical gesture and eye tracking selections methods) which will be described in greater detail below.

In a specific embodiment of the present subject matter, the SGD 20 may also include an accelerometer 57 as an input device. The accelerometer 57 may be provided to capture user inputs by measuring the orientation and/or movement of an object attached to or controlled by the user 22. In general, the accelerometer 57 of the present subject matter may comprise any suitable accelerometer known in the art. In one embodiment, the accelerometer 57 may comprise a device configured to measure both static and dynamic acceleration forces. Thus, the accelerometer 57 may be capable of detecting both the angle at which the device is tilted and the direction in which the device is moving. Additionally, it should be appreciated that the accelerometer 57 may be disposed at any location relative to a user 22 which permits the accelerometer 57 to function as an input device for the SGD 20. For example, the accelerometer 57 may be configured as a wrist-worn accelerometer and may be mounted to or integrated within any item adapted to be worn on a user's wrist. Thus, in various embodiments, the accelerometer 57 may be secured to or embedded within a bracelet, wristband, watch, or any other suitable wrist-worn apparel. However, it should be appreciated that the accelerometer 57 need not be configured to be worn on a user's wrist. For instance, in alternative embodiments, the accelerometer 57 may be integrated into the head mounted display unit 24, attached to a user's finger, arm, foot, or other suitable body part, or integrated into a separate device, such as a hand-held remote.

To enable the central processing unit 26 to analyze measurements made by the accelerometer 57, it should be appreciated that the accelerometer 57 may be communicatively coupled to the central processing unit 26, such as through a wired or wireless connection. Additionally, the central processing unit 26 may be capable of executing suitable gesture recognition processing routines configured to associate measurements transmitted from the accelerometer 57 with physical gestures (e.g., hand movements) performed by the user 22. As such, the accelerometer 57 may enable the SGD 20 to recognize numerous physical gestures as user inputs. Thus, in one non-limiting example, the SGD 20 may be configured such that, as a user 22 tilts or rotates his hand in a particular direction (e.g., in a counter-clockwise or leftward direction), objects displayed to the user 22 may be scanned or highlighted in that particular direction. As another example, the SGD 20 may be configured to associate outputs from the accelerometer which exceed a predetermined threshold (e.g., when a user 22 quickly moves his hand up or down) as an input selection of the highlighted object displayed on the head mounted display unit 24. Of course, it should be apparent to those of ordinary skill in the art that various other gestures and/or hand movements may be measured by the accelerometer 57 and recognized by the central processing unit 26 as user inputs for the SGD 20.

Additionally, in one exemplary embodiment of the present subject matter, the eye tracking features 44 of the SGD 20 may be embedded within or mounted to the head mounted display unit 24 to allow the user 22 to make hands-free input selections with the SGD. In particular, the eye tracking features 44 may permit a user's eye gaze to be tracked relative to the user's point of regard on the head mounted display unit 24. For instance, the central processing unit 26 of the speech generation device may be adapted to apply various image processing algorithms to images transmitted from an image capture device of the eye tracking features 44 so as to convert such images into a cursor position displayed on the lenses 68 (FIG. 3) of the head mounted display unit 24. In a particular embodiment, a mapping function, typically a second order polynomial function, may be employed to map eye gaze measurements from the two-dimensional images provided by the image capture device to the two-dimensional coordinate space of the lenses 68. As such, the cursor position provided on the lenses may correspond to the user's eye gaze direction and, thereby, permit the user 22 to make selections on the displayed user interfaces via any number of input selection methods.

In general, the eye tracking features 44 for use with the head mounted display unit 24 of the present subject matter may include such basic hardware elements as one or more image capture devices and one or more light sources. Such hardware elements may be coupled to any suitable processing equipment so as to function together to detect and analyze light reflected from the user's eyes. The image capture device(s) may include any number of devices suitable for capturing an image of a user's eyes. For example, image capture devices may include cameras, video cameras, sensors (e.g., photodiodes, photodetectors, CMOS sensors and/or CCD sensors) or other devices. Additionally, the light source(s) may include any number of lighting devices suitable for illuminating a user's eye(s), such as near infrared light emitting diodes (LEDs), so that the image capture device(s) can measure certain identifiable features associated with the illuminated eyes.

Referring still to FIG. 2, SGD hardware components also may include one or more integrated output devices, such as but not limited to a display device 42 and one or more speakers 28. The display device 42 may generally correspond to any device capable of displaying menus, keypads or other graphical user interfaces directly on a component of the head mounted display unit 24, such as on the lenses of the display unit 24. The speaker(s) 28 may generally correspond to any compact high power audio output device and may function as an audible interface for the speech generation device when computer processor(s) 50 utilize text-to-speech functionality. In accordance with the general functionality of a speech generation device, a user provides text, symbols corresponding to text, and/or related or additional information in a "Message Window" displayed on the display device which then may be interpreted by a text-to-speech engine and provided as audio output via the speaker(s) 28. Speech output may be generated in accordance with one or more preconfigured text-to-speech generation tools in male or female and adult or child voices, such as but not limited to such products as offered for sale by CereProc of Edinburgh, Scotland, Cepstral of Pittsburgh, Pa., HQ Voices offered by Acapela Group of Mons, Belgium, Flexvoice offered by Mindmaker of San Jose, Calif., DECtalk offered by Fonix of Salt Lake City, Utah, products by Loquendo of Torino, Italy, VoiceText offered by NeoSpeech of Sunnyvale, Calif., AT&T's Natural Voices offered by Wizzard of Pittsburgh, Pa., Microsoft Voices, digitized voice (digitally recorded voice clips) or others. Additionally, a volume control module 60 may be controlled by one or more scrolling switches. It should be appreciated that such scrolling switches may be provided on the housing module 30 encompassing the processing unit 26, on the head mounted display unit 24, or at any other location accessible to the user.

The speaker(s) 28 of the present subject matter may be mounted or otherwise disposed at any suitable location relative to the user 22. For example, as shown in FIG. 1, one or more speaker(s) 28 may be diposed separate from the head mounted display unit 24, such as by being worn as a pendant (e.g., around the user's neck or wrist). In another embodiment, illustrated in FIG. 3, one or more speakers 128 may be embedded within the housing module 30 of the SGD. In a further embodiment, also shown in FIG. 3, one or more speakers 228 may be mounted to or otherwise embedded within the head mounted display unit 24. Of course, it should be appreciated that the speaker(s) may be disposed at any other suitable location including, but not limited to, being attached to the user's clothes or being placed on or mounted to a user's bed, wheelchair, desk, nightstand or the like. Additionally, given the flexibility in locating the speaker(s) of the present subject matter, it should be appreciated that the speaker(s) may be in communication with the central processing unit 26 by any suitable means. For example, in one embodiment, the speakers 28 may be communicatively coupled to the processing unit 26 through a Bluetooth connection or any other suitable wireless communications protocol.

Referring still to FIG. 2, additional hardware components that optionally may be included within the speech generation device 20 of the present subject matter may include various communications devices and/or modules 58, such as but not limited to, an antenna, a cellular phone or RF device, a wireless network adapter and an infrared (IR) transceiver. For example, the antenna may be provided to facilitate wireless communication between the components of the SGD 20 and/or between the SGD 20 and other secondary devices (e.g., a secondary computer) in accordance with one or more wireless communications protocols, including but not limited to BLUETOOTH, WI-FI (802.11 b/g) and ZIGBEE wireless communication protocols. Additionally, the cellular phone or other RF device may be provided to enable a user 22 to make phone calls directly and speak during the phone conversation using the SGD 20, thereby eliminating the need for a separate telephone device. The wireless network adapter may be provided to enable access to a network, such as but not limited to a dial-in network, a local area network (LAN), wide area network (WAN), public switched telephone network (PSTN), the Internet, intranet or ethernet type networks or others. Further, the infrared (IR) transceiver may be provided to function as a universal remote control for the SGD 20 that may be capable of operating devices in the user's environment, for example including a TV, DVD player, and CD player.

It should be appreciated that, when different wireless communication devices 58 are included within an SGD 20, a dedicated communications interface module 62 may be provided within the central processing unit 26 to provide a software interface from the processing components of processing unit 26 to the communication device(s) 58. For example, communications interface module 62 may include computer instructions stored on a computer-readable medium that instruct the communications devices how to send and receive communicated wireless or data signals.

Additionally, when the hardware components within an SGD embodiment and particularly the communications interface module 62, include functional features by which the SGD 20 can interact wirelessly with other devices, users may be capable of utilizing the flexible input methods and software configurations of an SGD 20 to control and operate a secondary computer, such as a desktop or laptop computer. Specifically, the SGD 20 may appear to the computer as a Human Interface Device (HID) device which allows a user 22 who may not otherwise be able to type or control a mouse to operate the computer by taking advantage of the accessibility options provided by the SGD 20 and its specialized input features, such as the eye tracking features. To access and control a personal computer using available wireless features internal to the SGD 20, a user may plug an access control module (e.g. Bluetooth access control module) into a USB port on the user's personal computer and perform a communication pairing procedure that establishes short-range wireless communication connectivity between the SGD 20 and the personal computer. Of course, it should be appreciated that various other devices and/or methods may be used to sync the SGD 20 with the secondary computer. Once synced, the central processing unit 26 may initiate a suitable calibration process, such as that described below in reference to the eye tracking features, which is performed on the monitor or display of the secondary computer. For example, any number of calibration points may be displayed on the monitor of the secondary computer to enable calibration of the eye gaze measurements provided from the eye tracking features to the two-dimensional coordinates of the computer monitor. Eye tracking outputs from the SGD 20 may then be sent via the wireless connection to the personal computer and displayed as a mouse on the monitor to provide access to the computer.

It should be appreciated that all graphical user interfaces 64 and other menus that display "buttons" or other features that are selectable by a user 22 correspond to user input features that when selected trigger control signals being sent to the central processing unit 26 within an SGD 20 to perform an action in accordance with the selection of the user buttons. In accordance with disclosed technology, such graphical user interfaces 64 are displayed visually on the lenses 68 of the head mounted display unit 24. Some exemplary graphical user interfaces 64 correspond to conventional "QWERTY" keyboards, numeric keypads, or other customized keypads with alphanumeric identifiers. Buttons also may include words, phrases, symbols and other information that can be customized based on user preferences, frequency or use or other parameters.

Buttons may also be provided by which a user 22 can toggle additional menus and communication software screens such as preconfigured or customized compilations referred to herein as vocabulary lists or vocabulary list boxes. Vocabulary list boxes enable a user 22 to have a wide variety of words and phrases immediately available. By listing groups of related words and phrases, vocabulary list boxes enable a user 22 to quickly search through a wide range of text options when composing a message. For example, a user 22 can select a particular group of words and/or phrases and associate all selected items into a new vocabulary list, which may be named and optionally assigned a unique symbol to visually represent the vocabulary list. Features also may be provided to trigger actions performed by the SGD 20 upon selection of an item from a vocabulary list, for example, to automatically "speak" or provide as audio output the words/phrases from a vocabulary list box immediately as it is selected by a user 22, or to send the words/phrases from the vocabulary list box to the Message Window as it is selected by a user.

Referring now to FIG. 3, one exemplary embodiment of an SGD 20 is illustrated in accordance with aspects of the present subject matter, particularly illustrating various features of the head mounted display unit 24. As shown, the head mounted display unit 24 may be coupled to the central processing unit 26 via a cable 66. The cable 66 may include one or more electrical wires insulated from one another and may generally provide for the transmission of data and/or other information between the components of the SGD 20. As described above, however, the head mounted display unit 24 may also be in communication with the central processing unit 26 via a wireless connection. Additionally, one of ordinary skill in the art should appreciate that cable 66 may also be configured as a power cord so as to supply power to the components embedded within or mounted to the head mounted display unit 24 from a battery (not illustrated) disposed in the housing module 30.

The head mounted display unit 24 may generally serve as the interface between a speech generation device and its user, providing for the display of information to the user and also allowing for the capture of user input to define what information is ultimately communicated to others as spoken output or other outgoing communication. Thus, as indicated above, the head mounted display unit 24 may generally include various input and output components of the speech generation device. For example, the head mounted display unit 24 may include a display device 42 adapted to display menus, communication software screens and other graphical user interfaces 64 generated by the central processing unit 26. In particular, the display device 42 may be configured to provide graphical user interfaces 64 on the head mounted display unit 24 that overlay the normal front-facing view of the user 22 and, thus, permit the user 22 to view his surroundings while using and/or interacting with the SGD 20. The head mounted display unit 24 may also include eye tracking features that permit a user to make various hands-free input selections by tracking the user's eye movement. Additionally, the head mounted display unit 24 may further include one or more front-facing scene cameras 46 configured to capture images of a user's environment.

As described above, the head mounted display unit 24 may take the form of any item configured to be worn on a user's head, such as eyewear, helmets, goggles and the like. Thus, by way of example and not limitation of the present subject matter, the head mounted display unit 24 is generally depicted herein as being configured as a pair of glasses. Specifically, as shown in FIG. 3, the head mounted display unit 24 may generally include one or more lenses 68 (e.g., a pair of lenses 68) secured within a frame 70 of the glasses such that the lenses 68 are disposed within a field of view of the user. It should be appreciated that, in several embodiments, the each lens 68 may generally comprise any type of lens 68 known in the art. Thus, the lenses 68 may include tinted or shaded lenses and prescription lenses, such as near-sighted lenses, far-sighted lenses, bifocal lenses, trifocal lenses, graduated lenses, TRANSITION lenses and the like. The frame 70 may generally include a bridge portion 72 extending between the lenses 68 and a pair of stems 74 configured to be supported on the user's ears. Of course, as is generally understood, various other features and/or components (e.g., hinges) may be included with the glasses in addition to those described and depicted herein.

Various exemplary embodiments of display devices 42 that may be utilized with the head mounted display unit of the present subject matter will now be described with reference to FIGS. 3-6A. Generally, the display device 42 may serve as an output feature for the disclosed speech generation device by displaying graphical user interfaces 64 directly onto the lenses 68 or any other suitable component of the head mounted display unit 24 for view by the user 22. In one embodiment, illustrated in FIGS. 3 and 4, the display device 42 may be disposed within or adjacent to the head mounted display unit 24 and may be configured to project visual displays onto the lenses 68 of the display unit 24. In another embodiment, shown in FIGS. 5 and 6A, the lenses 68, themselves, may serve as the display device 142. For example, in a particular embodiment, the lenses 68 may be formed from a transparent OLED material such that visual information may be presented directly on the lenses 68 without obstructing a user's normal front-facing view. In a different embodiment, the lenses 68 may be configured as a non-transparent display. In such case, one or more scene cameras 46 may also be embedded within the display unit 24 such that a forward-facing view may be captured and subsequently displayed on the lenses 68 as the user's normal forward-facing view. Of course, it should be appreciated that the present subject matter need not be limited to the above described embodiments, but may include various other embodiments and/or configurations of display devices which would be apparent to those of ordinary skill in the art. Additionally, it should be appreciated that, although the display devices are generally described herein as displaying images on the lenses 68 of the head mounted display unit 24, the head mounted display unit 24 need not include lenses 68. Specifically, in alternative embodiments, the head mounted display unit 24 may be configured as a helmet or other head mounted item and, thus, images for the SGD 20 may be displayed on an eye shield, visor or other suitable component of the head mounted display unit 24.

Referring more particularly to FIGS. 3 and 4, in one exemplary embodiment, the display device 42 of the SGD 20 may be disposed within or adjacent to the head mounted display unit 24, such as by being mounted on or embedded within the frame 70 of the eyeglasses. For example, as particularly shown in FIG. 4, the stems 74 of the head mounted display unit 24 may be designed to accommodate the various components of the display device 42, such as by having an increasing width in the direction of the lenses 68. In the illustrated embodiment, the display device 42 may be configured to project one or more images (e.g., communication screens or other graphical user interfaces 64) onto the lenses 68 of the head mounted display unit 24. Thus, in one embodiment, the display device 42 may include a microdisplay 76 and any suitable optical features necessary for projecting images displayed on the microdisplay 76 into the field of view of the user. Thus, it should be appreciated that the lenses 68 may generally serve as transparent projection screens for the display unit 24. Accordingly, a user 22 may be permitted to observe his environment through the lenses 68 while also viewing the images displayed by the display device 42 so as to facilitate interaction with the speech generation device.

Referring particularly to FIG. 4, the display device 42 may include a microdisplay 76 mounted to and/or embedded within a portion of the head mounted display unit 24 (e.g., the stems 74). Generally, the microdisplay 76 may be configured to display images generated by the central processing unit of the SGD. Thus, in various embodiments, the microdisplay 76 may be communicatively coupled to the processing unit 26 via a wired or wireless connection, such as through a BLUETOOTH, WI-FI (802.11 b/g), ZIGBEE, or other suitable wireless communications protocol. The images originally displayed by the microdisplay 76 may then be received as reflected light by any suitable optical features, such as optical lenses 78, mirrors 80, or any other known optical devices for transferring light, to permit such images to be projected onto the lenses 68 and into the user's field of view. Accordingly, as a non-limiting example, FIG. 4 generally illustrates a simplified embodiment of a configuration for optically coupling the images displayed by the microdisplay 76 into the user's field of view. However, it should be apparent to those of ordinary skill in the art that various other optical configurations may be utilized within the scope of the present subject matter. As shown in FIG. 4, one or more optical lenses 78 and mirrors 80 may be mounted to and/or embedded within the stems 74 to optically couple the microdisplay 76 to the lenses 68. Thus, as indicated by the arrows, reflected light from the microdisplay 76 may pass through an optical lens 78, reflect off mirror 80 and pass through a second optical lens 78 to permit the microdisplay's image to be projected onto the lenses 68.

It should also be appreciated that, in alternative embodiments, the display device 42 may be configured to project and/or reflect images directly onto a user's eyes, such as the user's retinas. For example, suitable optical features, such as optical lenses 78 and mirrors 80, may be embedded within the frame 70 and/or the lenses 68 of the head mounted display unit 24 to enable images originating from the microdisplay 76 to be projected and/or reflected onto the user's eyes. In a particular embodiment, various reflective elements may be optically coupled and embedded within the lenses 68 of the present subject matter to permit images to be transmitted through the lenses 68 and reflected onto the user's eyes from any point on the lenses 68, such as from the center of the lenses 68. Examples of suitable optical configurations capable of reflecting images directly onto a user's eyes are available from Microvision of Redmond, Wash. and Lumus of Israel. Additionally, various see-through substrate-guided optical devices are disclosed in U.S. Pat. No. 7,724,442 to Amitai and U.S. Pat. No. 7,724,443 to Amitai, both of which are incorporated herein by this reference for all purposes.

Microdisplays suitable for use within scope of the present subject matter may generally comprise any compact electronic display known in the art configured to generate images using electro-optical effects and/or any other known optical effects including, but not limited to, liquid crystal on silicon (LCOS) displays, ferroelectric Liquid crystal on silicon (FLCOS) displays, digital micromirror devices (DMDs), organic light emitting diode (OLED) displays, transmissive liquid crystal displays (LCDs), and the like. Such displays are commercially available as microdisplays from various companies including Fourth Dimension Displays of Dalgety Bay, Scotland, Micron Technology of Boise, Idaho, Integrated Microdisplays of Hong Kong, Kopin of Taunton, Mass., Syndiant of Dallas, Tex. and eMagin of Bellevue, Wash. Further, suitable configurations of any necessary optical features that may be used within the head mounted display unit of the present subject matter include those configurations utilized in the head mounted displays (HMDs) and other near to the eye applications (NTE) applications provided by Lumus of Israel, Microvision of Redmond, Wash. and eMagin of Bellevue, Wash.

Referring back to FIG. 3, there is also illustrated an embodiment of a scene camera 46 that may be utilized as input feature for the SGD 100. Generally, the scene camera 46 may comprise a video camera or other suitable image capturing device configured to capture a front-facing view of the user 22. Thus, as shown in FIG. 3, the scene camera 46 may be embedded within the front of the head mounted display unit 24, such as within the bridge portion 72, such that the forward-facing view of the user 22 may be captured. It should be appreciated that, in further embodiments, multiple scene cameras 46 may be embedded within or mounted to the head mounted display unit 24. For example, in a particular embodiment, it may be desirable for the head mounted display unit 24 to include two scene cameras 46, with each scene camera 46 configured to capture the forward-facing view of one of the user's eyes. As such, a scene camera 46 may be positioned adjacent to each lens 68 of the of the head mounted display unit 24 (e.g., above, below, or to the side of each lens). Additionally, it should also be appreciated that the scene camera(s) 46 may be communicatively coupled to the processing unit 26 via a wired or wireless connection. Thus, forward-facing images from the scene camera(s) 46 may be transmitted as inputs to the central processing unit 26.

The scene camera(s) 46 may generally provide numerous advantages for the SGD 20 of the present subject matter. As will be described below, input from the scene camera(s) 46 may permit the lenses 68 of the head mounted display unit 24 to be configured as non-transparent display devices 142. Moreover, the scene camera(s) 46 may allow the user 22 to interact with additional objects in his environment, such as through an environmental control system. Further, input from the scene camera(s) 46 may be used to augment user inputs provided by the eye tracking features.

In one exemplary embodiment, the speech generation device 20 of the present subject matter may be configured to communicate with an environmental control system (also referred to as a home automation system) installed within a user's home. Such systems generally allow for the remote control of various electronic devices in the user's immediate surroundings. For example, the lights, television, automatic door opener, and other electronic equipment within a room may be wired into and controlled by a central controller of the environmental control system. The user 22 may then communicate with the controller, such as through a remote control device or voice recognition system, to turn on/off or otherwise operate the electronic equipment. Additionally, in accordance with aspects of the present subject matter, a user 22 may also be able to communicate with the controller of an environmental control system via the central processing unit 26 of the disclosed SGD 20.

In particular, the scene camera(s) 46 may be utilized to assist the central processing unit in calibrating a user's eye gaze to an exterior surface of an electronic component controlled by the environmental control system. Generally, any known calibration method may be used to permit recognition of the exterior surfaces of the electronic components by the SGD 20. As one example, the scene camera 46 may be used in conjunction with a light source 96 embedded within or secured to the frame 70 of the head mounted display unit 24 to permit gaze direction to be calibrated in reference to the user's environment. Specifically, as shown in FIG. 3, a light source 96, such as a laser or other light device capable of focusing light over an extended distance, may be mounted to and/or embedded within the frame 70. To perform the calibration, light from the light source 96 may be directed through a light splitter (not illustrated) so as to project any number of calibration points on and/or adjacent to the area for which calibration is sought. For instance, the scene camera's field of view may include a wall or other section of a user's bedroom or environment. Thus, a plurality calibration points may be projected across the scene camera's field of view (thereby permitting the camera 46 to capture images of the calibration points) so as to permit calibration onto the surfaces of the electronic components contained within such view. Thereafter, the user's eye movement may be tracked by the eye tracking features of the head mounted display unit 24 as the user 22 is prompted to look consecutively at the projected calibration points. After such process is completed, the central processing unit 26 may then be configured to employ any suitable mapping function to correlate the eye gaze images provided by the eye tracking features to the two-dimensional images provided by the forward-facing scene camera 46. Similar steps may then be followed to calibrate the eye gaze images to the particular electronic components contained within the scene camera's field of view.

Once properly calibrated, a user 22 may be able to simply gaze at an electronic component within his environment and provide an input, such as by using a blink, dwell, blink/dwell, blink/switch or external switch selection method (described below), to communicate to the central processing unit 26 the particular electronic component desired to be operated. The central processing unit 26 may then communicate such information to the controller of the environmental control system, via a wired or wireless connection, to enable the chosen electronic component to be turned on/off or otherwise controlled.

In another exemplary embodiment of the present subject matter, the scene camera 46 may be used to augment the input methods provided by the eye tracking features of the speech generation device 20. In particular, the scene camera 26 may permit the SGD 20 to implement optical gesture technology to provide an additional or supplementary input selection method for the user 22. To implement such technology, the central processing unit 26 may be capable of executing suitable image processing routines configured to analyze and recognize hand gestures performed by the user 22 and captured by the scene camera 46. Such hand gestures may then be correlated to the various utterances commonly used by the user 22. As a non-limiting example, if the user 22 waves his hand within the field of view of the scene camera 26, the SGD may be configured to output "Hello" or "How are you doing" through its speaker(s) 28. As another non-limiting example, a thumbs-up gesture may correspond to "Yes" or "I am doing well" and the SGD 20 may be configured to provide such corresponding spoken output. Of course, it should be appreciated that various other hand gestures corresponding to any number of other spoken utterances may be programmed into the processing unit 26 so as to be recognizable by the SGD 20.

Referring now to FIGS. 5 and 6A, another exemplary embodiment of a display device 142 is illustrated in accordance with aspects of the present subject matter. Specifically, each lens 68 of the head mounted display unit 24 may be configured as a display device 142 for the SGD 20. Thus, in one exemplary embodiment, the lenses 68 may be configured as a display device 142 formed from transparent organic light-emitting diode (TOLED) materials. As such, communication software screens and other graphical user interfaces 64 generated by the processing unit 26 may be displayed directly onto the lenses 68. Additionally, due to the transparent nature of the TOLED material, a user 22 can maintain his normal front-facing view while using the speech generation device, with the images generated by the processing unit 26 being provided as a visual overlay on the lenses 68. As used herein, a "transparent" material means a medium that is capable of transmitting at least some light so that objects or images can be seen fully or at least partially through the material.

TOLED displays devices are well known in the art and, thus, a detailed description of such displays need not be provided herein. However, in general, TOLED displays are typically formed from transparent components (e.g., transparent layers of material) which allow the resulting display to be at least partially or, preferably, fully transparent to the user 22. In some embodiments, a TOLED display may be fully transparent in the off-state and within a range of between about 50-85% transparent during active operation. To permit the display of images, a TOLED display generally includes one or more layers of organic material (i.e., the emissive layer(s)) that emit light by the movement and re-combination of electrons (negative charges) with holes (positive charges). Specifically, when voltage potential is applied to a TOLED display, negatively charged electrons move from a cathode layer through an intermediate layer into the emissive layer(s). At the same time, positively charged holes move from an anode layer through an intermediate layer and into the same organic light-emitting layer. When the positive and negative charges meet in the emissive layer(s) of organic material, they combine and produce photons having a frequency falling within the spectrum of visible light so as to provide any desired display.

Typically, the multiple layers of TOLED matrix material are formed on a substrate that serves as the base or support for the display. The substrate may be generally formed from any transparent material, such as glass, clear plastic materials, or the like. Additionally, the substrate may be configured to have any desired shape, with the layers of TOLED material being designed to conform to the shape of the substrate. Thus, in accordance with aspects of the present subject matter, the substrate of the TOLED display may be designed as a lens 68 and may be configured to fit within the frame 70 of the head mounted display unit 24. As such, images generated by the central processing unit 26 may be displayed directly on the lenses 68 and within the user's field of view.

A detailed description of the general configuration of TOLED displays, as well as numerous other features of such displays, is disclosed in U.S. Provisional Patent Application entitled "SPEECH GENERATION DEVICE WITH OLED DISPLAY" corresponding to U.S. Ser. No. 61/250,274, which is hereby incorporated herein by this reference in its entirety for all purposes.

Still referring to FIGS. 5 and 6A, in another exemplary embodiment of the present subject matter, the display device 142 of the head mounted display unit 24 may comprise a non-transparent display. Specifically, the lenses 68 of the head mounted display unit 24 may be configured as a non-transparent display. For example, any known display device, such as a non-transparent OLED display, light-emitting diode (LED) display, electroluminescent display (ELD), plasma display panel (PDP), liquid crystal display (LCD), or any other suitable display, may be configured to be lens-shaped. As such, the lens-shaped non-transparent display may be configured to fit within the frame 70 of the head mounted display unit 24. Additionally, in alternative embodiments, the lenses 68 may only be partially configured as a non-transparent display. For example, each lens 68 may be formed to include a portion of transparent material (e.g., glass, plastic or the like) to provide the user with a forward-facing view, with the remainder of the lens 68 being configured as a non-transparent display.

Further, when the lenses 68 of the present subject matter are configured as non-transparent display devices, the head mounted display unit 24 may also include one or more forward-facing scene cameras 46 (FIG. 3) communicatively coupled to the central processing unit 26 in order to provide the user with a forward-facing view. For example, the central processing unit 26 of the speech generation device 20 may include suitable software instructions and processing functionality to permit the images captured by the scene camera(s) 46 to be combined with the graphical user interfaces 64 generated by the processing unit 26. Thus, images transmitted from the scene camera(s) 46 to the processing unit 26 may be combined with menus, communications software screens and the like and subsequently transmitted to the lenses 68 for display as a combined image. As such, the image presented to the user 22 appears as the user's normal front-facing view with user interface screens 64 provided as a visual overlay.

It should be appreciated that the driving circuitry and any additional electronic components and/or features required for the operation of the display devices disclosed herein may be embedded within or secured to the head mounted display unit 24. Alternatively, such components may be housed within the separate housing module 30 and communicatively coupled to the display device(s) via a wired or wireless connection. Additionally, in several embodiments, the display device(s) may be configured to interface with the central processing unit 26 and, thus, eliminate the need for any additional driving circuitry. Moreover, power supply features required to supply operating power to the display device(s) may be embedded within the frame 70 of the display unit 24 or housed in the separate housing module 30. For example, a power cord may electrically couple a battery disposed in the housing module 30 with the display device(s) to provide power thereto. Alternatively, a small battery may be embedded within the head mounted display 24 to supply power to the display device(s).

Additionally, it should be appreciated that the display devices of the present subject matter may provide several advantages for a speech generation device. For example, due to their relatively small size, the display devices allow for a lightweight head mounted display unit and also require a low activation or driving voltage. The reduced weight and power requirements of the disclosed display devices help to increase a potential user's mobility and also lengthen the duration of assisted communication by improving battery life. Moreover, the display devices permit a user to interact with and use a speech generation device while eliminating or reducing the potential visual restriction that generally accompanies a conventional SGD. In particular, a user can view communication-related information displayed on the head mounted display unit and, at the same time, may be able to view his environment and/or interact with persons around him.

Referring still to FIG. 5, there is also illustrated one embodiment of a head mounted display unit 24 including eye tracking features in accordance with aspects of the present subject matter. As shown, one or more camera(s) 82 may be embedded within or secured to the frame 70 of the head mounted display unit 24 and may be configured to capture images of the user's eyes. In particular, one or more cameras 82 may disposed substantially adjacent to each of the lenses 68 and may be angled in the direction of one of the user's eyes to permit the movement of such eye to be tracked. Of course, it should be appreciated that the cameras 82 need not be positioned as shown in FIG. 5, but may be generally located at any position relative to the user 22 by which images of the user's eye(s) may be captured. It should also be appreciated that, depending on numerous factors (e.g., the field of view of the camera used), the distance required between the camera 82 and a user's eye in order to capture images of the entire eye may vary significantly. For example, assuming that the average width of a human eye is 24 millimeters (mm), a camera having a field of view of 50 degrees may need to be spaced apart from a user's eye approximately 26 mm to capture an full image of the eye. However, as the field of view of the camera 82 is increased, the required spacing can be reduced significantly. For instance, with a camera having a field of view of 70 degrees, the minimum distance required between the camera and the user's eye may be reduced to approximately 17 mm.

Additionally, one or more light sources 84, such as one or more near infrared LEDs, may be disposed within or secured to the frame 70. In general, the light sources 84 may be used to generate a corneal reflection in the user's eye, thereby facilitating the determination of eye gaze direction. As such, it should be appreciated that the light sources 84 may be disposed at any location on or in the frame 70 that allows light from the light sources 84 to be directed onto the user's eyes. As shown in FIG. 5, the light source 84 is embedded within the frame 70 so as to be spaced apart from the camera 84 and, thereby, is radially offset from the camera's optical axis (i.e., an axis extending from the center of the camera lens to the center of the camera's field of view). Accordingly, a dark pupil field may be generated and captured by the camera 82. In alternative embodiments, the light source 84 may be disposed substantially adjacent to the camera's optical axis, such as adjacent to the center of the camera lens, in order to generate a bright pupil field. Further, it should be appreciated that one or more microprocessors 86 may be embedded within one or both of the stems 74 of the head mounted display unit 24 to provide processing functionality to the eye tracking features and may be in communication with the central processing unit 26 of the speech generation device 20. Alternatively, the eye tracking features may be configured to directly interface with the central processing unit 26 and may be communicatively coupled to the processing unit 26 via a wired or wireless connection.

Referring now to FIG. 6A, another embodiment of a head mounted display unit 24 having eye tracking features is illustrated. As shown, a plurality of eye sensing elements 88 may embedded around the perimeter of each lens 68 in order to detect a user's eye movement/location. Generally, the eye sensing elements 88 may be cameras, sensors (e.g., photodiodes, photodetectors, CMOS sensors and/or CCD sensors) or any other suitable device. It should be appreciated that the eye sensing elements 88 may be used for eye gaze detection and tracking instead of or in conjunction with the camera 82 and light source 84 components previously described with reference to FIG. 5. Additionally, similar to that described above, processing functionality for the eye sensing elements 88 may be provided by one or more microprocessors 86 disposed within the frame 70 or by the central processing unit 26 of the SGD 20.

A further embodiment of eye tracking features that may be utilized with the head mounted display unit 24 of the present subject matter is illustrated in FIG. 6B. As one non-limiting example, when the lenses 68 of the head mounted display unit 24 are configured as a TOLED display device, the lenses 68 may be formed to include not only a matrix of TOLED material but also sensor elements. Specifically, each element 90 in the matrix display shown in FIG. 6B may generally correspond, for example, to a transparent OLED group, pixel or subpixel of the display device 142. Thus, in the illustrated embodiment, each matrix element 90 may include an integrated combination of transparent OLEDs 92 and sensors 94. In one embodiment, the different transparent OLEDs 92 within each group 90 may include an OLED configured for different frequencies of operation, thus corresponding to different spectrums, such as green light, red light, blue light, near infrared light or others. Additionally, sensors 94 may correspond to photodetectors, photo diodes, CMOS sensors, CCD sensors or other suitable image sensing elements. It should be appreciated that any number and positioning of such components within the lenses 68 may be practiced in accordance with aspects of the presently disclosed technology. Additionally, application of the disclosed sensors 94 need not be limited to TOLED display devices. Rather, such sensors 94 may be generally integrated into the lenses 68 of the head mounted display unit 24 to provide eye tracking features for all applications of the present subject matter. Further, it should be appreciated that the sensors 94 can be used in eye gaze detection tracking instead of or in addition to the camera 82 and light source 84 components previously described with reference to FIG. 5 or the sensing elements 88 previously described with reference to FIG. 6A.

One of ordinary skill in the art should appreciate that various examples of eye tracking systems and methods are known, many of which can be employed in accordance with one or more aspects of the presently disclosed technology. As such, the scope of the present subject matter need not be limited to the exact eye tracking features and/or configurations depicted in FIGS. 5-6B. Examples of known eye tracker devices are disclosed in U.S. Pat. No. 3,712,716 to Cornsweet et al.; U.S. Pat. No. 4,950,069 to Hutchinson; U.S. Pat. No. 5,589,619 to Smyth; U.S. Pat. No. 5,818,954 to Tomono et al.; U.S. Pat. No. 5,861,940 to Robinson et al.; U.S. Pat. No. 6,079,828 to Bullwinkel; and U.S. Pat. No. 6,152,563 to Hutchinson et al.; each of which is hereby incorporated herein by this reference for all purposes. Examples of suitable eye tracker devices also are disclosed in U.S. Patent Application Publication Nos.: 2006/0238707 to Elvesjo et al.; 2007/0164990 to Bjorklund et al.; and 2008/0284980 to Skogo et al.; each of which is hereby incorporated herein by this reference for all purposes.

Additionally, as indicated above, the central processing unit 26 of the SGD 20 may be adapted to apply various image processing algorithms to the images transmitted from the eye tracking features so as to convert such images into a cursor position displayed on the lenses 68 of the head mounted display unit 24. Accordingly, the user 22 may control the cursor position through his eye movements and, thereby, make input selections on the graphical user interfaces 64 displayed by the display device 42. Optional selection methods that may be activated using the eye tracking features of the present subject matter may include blink, dwell, blink/dwell, blink/switch and external switch. Using the blink selection method, a selection may be performed when the user 22 gazes at an object displayed on the lenses 68 and then blinks for a specific length of time. In particular, the central processing unit 26 may be provided with software equipped with blink detection algorithms that enable blink recognition. Additionally, the processing unit 26 can be programmed to interpret as a "blink," a set duration of time during which an associated camera cannot see the user's eye. The dwell method of selection is implemented when the user's gaze is stopped on an object displayed on the lenses 68 for a specified length of time. The blink/dwell selection combines the blink and dwell selection so that the object displayed on the lenses 68 can be selected either when the user's gaze is focused on the object for a specified length of time or, if before that length of time elapses, the user 22 blinks an eye. In the external switch selection method, an object is selected when the user 22 gazes on the object for a particular length of time and then closes an external switch. It should be appreciated that the external switch may generally comprise a button, flip switch or any other suitable mechanically actuated switch and may be disposed at any location accessible to the user 22. For example, the switch may be provided on the head mounted display unit 24, the separate housing module 30, on a remote control provided to the user 22, on a user's wheelchair or bed, or at any other suitable location in which the user 22 has constant and reliable motor control. The blink/switch selection combines the blink and external switch selection so that the object displayed on the lenses 68 can be selected when the user's gaze blinks on the object and the user 22 then closes an external switch. In each of these selection methods, the user 22 can make direct selections instead of waiting for a scan that highlights the individual object displayed on the lenses 68 of the head mounted display unit 24. However, it should be appreciated that, as an alternative method, a scanning selection method may be provided in which highlighting is used in a specific pattern so that a user 22 can blink or use a switch (or other device) to make a selection when the desired object is highlighted. Additionally, it should be appreciated that, when the central processing unit 26 uses eye tracking features to interact with the SGD 20, the software can be programmed (at the user's discretion) to track both eyes or to track only one eye.

The central processing unit 26 of the speech generation device 20 may also be provided with suitable software instructions enabling the processing unit 26 to properly calibrate the eye tracking features. For example, the processing unit 26 may employ detection and tracking algorithms to accurately estimate the centers of the user's eyes, pupils and corneal-reflexes (known as glint) in two-dimensional images generated by the eye tracking features. Generally, standard interactive calibration processes are known in which the user 22 is prompted to gaze consecutively at calibration points displayed (randomly or not) on the lenses 68 of the head mounted display unit 24. Such calibration techniques may generally use a number of calibration points ranging, for example, from one to sixteen points. In a particular embodiment of the present subject matter, nine calibration points may be employed. Additionally, the user may be required to gaze at each calibration point for a predetermined period of time. Once this calibration process is completed, a gaze measurement in the two-dimensional image provided by the eye tracking features will be mapped to its point of gaze on the lenses 68 using an equation of this nature: $(Xs, Ys)=F(Xi, Yi)$ with F being the mapping function, $(Xs, Ys)$ the screen coordinates (or Point of Gaze) on the lenses 68 and $(Xi, Yi)$ the gaze measurement drawn from the image provided by the camera or other image capture device. Of course, it should be appreciated that the gaze measurements need not be drawn in a two-dimensional coordinate system, but may also be drawn from the locations of the pupil and corneal reflexes in a three-dimensional coordinate system. Further, in order to evaluate the success of the calibration procedure, a test desirably is conducted as follows. The user 22 is asked again to look at some points displayed on the lenses 68, the gaze points are estimated using the mapping function, and an average error (in pixels) is computed between the actual points and the estimated ones. If the error is above a threshold, then the user 22 is required to re-calibrate.

Additional features, elements and steps that may be optionally incorporated into a speech generation device in accordance with the disclosed technology are disclosed in U.S. Provisional Patent Application entitled "HAND-HELD SPEECH GENERATION DEVICE" corresponding to U.S. Ser. No. 61/228,256 and U.S. Provisional Patent Application entitled "SEPARATELY PORTABLE DEVICE FOR IMPLEMENTING EYE GAZE CONTROL OF A SPEECH GENERATION DEVICE" corresponding to U.S. Ser. No. 61/217,536, which are hereby incorporated herein by this reference in their entirety for all purposes.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A speech generation device, comprising:
   a head mounted display unit configured as an item to be worn on a user's head, the head mounted display unit including a display device for displaying one or more images within a field of view of the user;
   one or more scene cameras configured to capture one or more images of at least a portion of the forward-facing field of view of the user's eyes including a view of an exterior surface of an electronic component within the user's environment and within the user's current forward-facing field of view;
   a speaker for generating audio outputs; and
   a processing unit communicatively coupled to the head mounted display unit, the one or more scene cameras, and the speaker, the processing unit including a processor and a related computer-readable medium storing instructions executable by the processor, wherein the instructions stored on the computer-readable medium configure the speech generation device:
   to generate text-to-speech output;
   to analyze the one or more images captured by the one or more scene cameras in order to calibrate the movement of the user's eyes to the exterior surface of the electronic component within the user's environment, wherein calibration to the electronic component contained within a scene camera's field of view is based on a mapping function that correlates eye gaze images to the one or more images captured by the one or more scene cameras;
   to determine based on eye gaze images and the calibration to the exterior surface of the electronic component that the user's gaze is directed to the exterior surface of the electronic component; and to communicate operational information based on the user's eye gaze being directed to the electronic component to a controller of the electronic component to remotely control operation of the electronic component by turning the electronic component on/off.

2. The speech generation device of claim 1, wherein the head mounted display unit comprises a frame and one or more lenses secured within a portion of the frame, the lenses being configured to be disposed within the field of view of the user.

3. The speech generation device of claim 2, wherein the display device is configured to project the one or more images onto the one or more lenses.

4. The speech generation device of claim 1, wherein the head mounted display unit comprises a frame, the display device being secured to a portion of the frame at a location within the field of view of the user.

5. The speech generation device of claim 4, wherein the display device is configured as a lens of the head mounted display unit.

6. The speech generation device of claim 4, wherein the display device comprises a non-transparent display device.

7. The speech generation device of claim 6, further comprising a camera configured to capture one or more images of at least a portion of the field of view of the user, wherein the instructions stored on the computer-readable medium further configure the speech generation device to display the one or more images captured by the camera on the non-transparent display device.

8. The speech generation device of claim 1, further comprising eye tracking features configured to detect movement of at least one of the user's eyes.

9. The speech generation device of claim 1, wherein the processing unit is disposed separate from the head mounted display unit or the processing unit is embedded within or mounted to a portion of the head mounted display unit.

10. The speech generation device of claim 1, wherein the speaker is disposed separate from the head mounted display unit or embedded within or mounted to the head mounted display unit.

11. The speech generation device of claim 1, further comprising a camera configured to capture one or more images of at least a portion of the field of view of the user.

12. The speech generation device of claim 11, further comprising a light source configured to direct at least one beam of light into the portion of the field of view captured by the camera.

13. The speech generation device of claim 11, further comprising eye tracking features configured to detect movement of at least one of the user's eyes, wherein the instructions stored on the computer-readable medium further configure the speech generation device to analyze the one or more images captured by the camera in order to calibrate the movement of the at least one of the user's eyes to an exterior surface within the user's environment.

14. The speech generation device of claim 11, wherein the instructions stored on the computer-readable medium further configure the speech generation device to analyze the one or more images captured by the camera in order to recognize hand gestures performed by the user and captured by the camera.

15. The speech generation device of claim 1, further comprising an accelerometer configured to capture inputs provided by the user.

16. The speech generation device of claim 15, wherein the accelerometer is communicatively coupled to the processing unit, wherein the instructions stored on the computer-readable medium further configure the speech generation device to associate signals transmitted from the accelerometer with a physical gesture performed by the user.

17. The speech generation device of claim 1, wherein the electronic component within the user's environment and within the user's current forward-facing field of view comprises a home automation system component.

* * * * *